United States Patent
Grenier

(10) Patent No.: US 8,324,504 B2
(45) Date of Patent: Dec. 4, 2012

(54) CROSS-LINKED POLYOLEFIN MATERIAL BLEND MOLDED ELECTRICAL TRANSMISSION INSULATING PRODUCTS

(75) Inventor: Gary C. Grenier, New Boston, NH (US)

(73) Assignee: Marmon Utility LLC, Milford, NH (US)

( * ) Notice: Subject to any disclaimer, the term of this patent is extended or adjusted under 35 U.S.C. 154(b) by 0 days.

(21) Appl. No.: 13/113,451

(22) Filed: May 23, 2011

(65) Prior Publication Data

US 2012/0012364 A1    Jan. 19, 2012

Related U.S. Application Data

(63) Continuation of application No. 12/362,005, filed on Jan. 29, 2009, now abandoned, which is a continuation-in-part of application No. 11/356,658, filed on Feb. 16, 2006, now Pat. No. 7,501,469.

(51) Int. Cl.
*H01B 3/30* (2006.01)
*B32B 17/10* (2006.01)
*C08L 23/26* (2006.01)

(52) U.S. Cl. ......... 174/138 C; 174/110 PM; 174/137 R; 174/196; 428/441; 524/521

(58) Field of Classification Search ........... 174/110 PM, 174/110 SR, 196, 137 R, 138 C; 428/441; 524/521
See application file for complete search history.

(56) References Cited

U.S. PATENT DOCUMENTS

| | | | |
|---|---|---|---|
| 4,749,824 A * | 6/1988 | Orbeck | 174/179 |
| 5,312,861 A | 5/1994 | Meverden et al. | |
| 5,430,091 A | 7/1995 | Mahabir | |
| 6,936,655 B2 | 8/2005 | Borke et al. | |

FOREIGN PATENT DOCUMENTS

EP    1512711 A1 *    3/2005

OTHER PUBLICATIONS

Schwartz et al, Plastics Materials and Processes, Can Nostrand Reinhold Co., New York, 1982, pp. 59-62.

* cited by examiner

*Primary Examiner* — Fred M Teskin
(74) *Attorney, Agent, or Firm* — Hayes Soloway P.C.

(57) ABSTRACT

A new cross linked polyolefin material combination that is designed to replace current high-density polyethylene ("HDPE") materials for use with molded or over-molded electrical transmission products. Such molded or over-molded electrical transmission products include, for example, vise-top pin insulators, line post insulators, F-neck, C-neck, and J-neck pin insulators of classes ANSI 55-3, 55-4, and 55-5, Spacer cable spacers, Brackets, hangers, Line post sensors, cable restraint insulators, and transmission style insulators.

9 Claims, 1 Drawing Sheet

CROSS-LINKED POLYOLEFIN MATERIAL BLEND MOLDED ELECTRICAL TRANSMISSION INSULATING PRODUCTS

RELATED APPLICATIONS

This Application is a continuation of abandoned U.S. application Ser. No. 12/362,005, entitled "CROSS-LINKED POLYOLEFIN MATERIAL BLEND MOLDED ELECTRICAL TRANSMISSION INSULATING PRODUCTS" filed on Jan. 29, 2009, which is herein incorporated by reference in its entirety. Application Ser. No. 12/362,005 is a continuation-in-part of U.S. application Ser. No. 11/356,658, now U.S. Pat. No. 7,501,469 entitled "CROSS-LINKED POLYOLEFIN MATERIAL BLEND" filed on Feb. 16, 2006, which is herein incorporated by reference in its entirety.

BACKGROUND

The present technology relates to polymer material blends, products containing such blends that are manufactured for the electrical utility market, and methods of manufacturing such products. In particular, the polymer material blends described herein can be cross-linked polyolefin blends that, upon molding, have characteristics compatible with the requirements of electrical utility products. Insulator products that can find application with the polymer material blends described herein can be from a number of electrical insulator devices including, but are not limited to, vise-top insulators; pin insulators; line post insulators; F-neck, C-neck, and J-neck pin insulators of classes ANSI 55-3, 55-4, and 55-5; Spacer cable spacers, Brackets, hangers, Line post sensors, cable restraint insulators, and vertically mounted or horizontally mounted transmission products.

Thermoplastic materials have been used in the electrical industry for many years, such as in 15 kV pin type polymeric insulators, which were introduced in 1969. Since that time additional insulators have been added, such as in the 25 kV and 35 kV categories. Vise-tops insulators, which include an integral cable clamp, were added to each voltage category some time later. The thermoplastic material presently used to produce the insulators is a high-density polyethylene (HDPE). Stabilizers are incorporated in optimum percentages to maintain the original electrical and mechanical properties for the lifetime of the product as it is exposed to the environment, in particular ultraviolet (UV) light, and electrical stress from the energized cables and system. The stabilizers also impart other properties such as track and UV resistance. The final blended material possesses electrical and mechanical characteristics sufficient for the intended application. However, the typical HDPE material has a temperature limitation at/below 120° C.

Insulators utilized in overhead electrical applications to isolate electrical cables from ground are required to meet all performance criteria of the applicable ANSI C 29.1 specification, the disclosure of which is hereby incorporated by reference in its entirety. It also is required to meet requirements of tracking and UV Resistance. As population densities, manufacturing and other service industries have grown, utilities have been required to carry heavier current loads resulting in hotter conductors. Polyurethane insulators are typically used in such applications since currently utilized HDPE materials cannot meet such thermal conditions.

Therefore, under present electrical transmission requirements, there exists a need for materials and electrical transmission products that can withstand conductor temperatures in excess of 120° C. without weakening or loss of structure and performance.

BRIEF SUMMARY

A new material combination that is designed to replace current high-density polyethylene ("HDPE") materials for use with electrical transmission products is disclosed herein. The new material combination is a blended material that can provide all of the existing properties found in the HDPE material with the addition of a higher temperature capability at or above 250° C. The component materials used in the blended material are offered by multiple suppliers. The combination of components at or about the preferred percentage level by weight imparts the desired balance of electrical and physical properties. One of the components can be made up of ingredients that add color, long-term stability from UV exposure, and track resistance. Other ingredients can be added to promote adhesion such that the new material combination may be over-molded to a structural material such as a fiberglass rod to add cantilever strength to the over-molded insulator after the molding process. The result of this material combination is an insulator that will meet or exceed the American National Standards Institute (ANSI) requirements and have an elevated temperature capability.

Electrical transmission products, such as insulators, and methods of manufacturing such products are also disclosed herein.

BRIEF DESCRIPTION OF SEVERAL VIEWS OF THE DRAWINGS

Specific examples have been chosen for purposes of illustration and description, and are shown in the accompanying drawings, forming a part of the specification.

DETAILED DESCRIPTION

Figure 2:
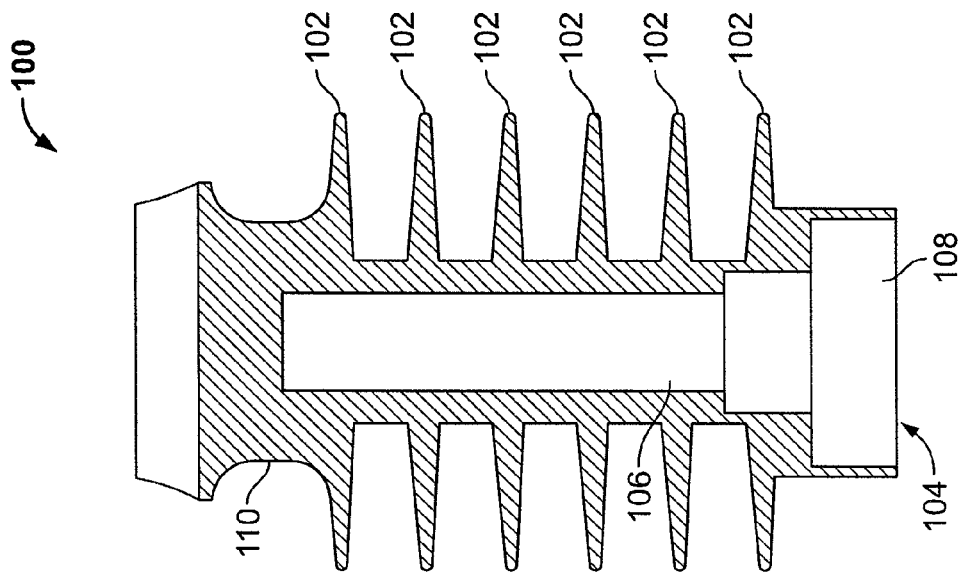
FIG. 2 illustrates a cross section of the electrical transmission product of FIG. 1.

As will be further described herein, formulations of the current polymer material blends are generally comprised of four components:

1) Low density cross-linkable base resin;
2) High density resin;
3) Catalyst masterbatch; and
4) Color masterbatch.

In at least one preferred embodiment, a formulation for a polymer material blend includes at least one low density cross-linkable polymer base resin present in an amount at about 53% by weight of the total compound, at least one high density polymer resin present in an amount at about 37% by weight of the total compound, catalyst masterbatch present in an amount at about 5% by weight of the total compound, and color masterbatch present in an amount at about 5% by weight of the total compound.

The weight percentages of each component of the total compound can be varied by plus or minus 10% of the preferred weight percentage for each component. Accordingly, the at least one low density cross-linkable polymer resin can be present in an amount from about 47.7% by weight of the total compound to about 58.3% by weight of the total compound. The at least one high density polymer can be present in an amount from about 33.3% by weight of the total compound to about 40.3% by weight of the total compound. The catalyst masterbatch and the color masterbatch can each be present in amounts from about 4.5% by weight of the total compound to about 5.5% by weight of the total compound.

The current blended material formulations utilize a cross-linkable base resin and catalyst to obtain a higher temperature rating than conventional formulations. These cross-link materials are only commercially available as a low-density polyethylene (LDPE) resin because of the polymerization process used in their manufacture. In one exemplary formulation, Silane based cross-linkable materials are used, such as the Aquathene AQ 120-00 Ethylene Vinylsilane copolymer product, commercially available from Equistar Chemical Company. Such low-density resins are not used in conventional materials for molding electrical transmission products as the low-density materials offer a significant reduction in mechanical strength. Further, previous attempts to use the low-density cross-linked material without a high-density component resulted in insulators with lower AC Voltage puncture strength. The material also showed a reduction in ability to support the mechanical loads applied from the typical installation. However, it is known to use such low density materials on cable jacketing, in which mechanical strength was secondary, in order to provide a high temperature material.

In order to provide the higher mechanical properties found in the current HDPE material in the current formulations containing Silane based cross-linkable materials, a percentage of HDPE resin is added to the Silane material blend. The percentage of HDPE is added in levels high enough to obtain the required mechanical strength without preventing the cross-linking from occurring. The high-density component can be from a variety of sources. Two examples that can be used are from Equistar's Petrothene product category, which offers LM 6007-00, which is a blow molding grade, and LR 5900-00, a wire and cable resin. It is preferred to use a high density material having a similar melt index to the low density material. In addition to providing mechanical strength, the high-density component also serves as an insulator and offers abrasion resistance.

A third formulation component, used in connection with the low-density cross-link base resin, is a "catalyst masterbatch." The catalyst masterbatch can be a cross-linking catalyst, such as CM 04483 (Aquathene). Moisture is the mechanism that initiates and sustains the reaction that generates a cross-linked product. Two-part Silane base materials have been used in extrusion of cables but have not been used in a molding process such as the processes described herein. The large molded part thickness can create internal part voids, which are detrimental to the short and long term electrical characteristics of the part. These long molding cycle times can create problems with cross-link materials, which can cure and degrade the material during the molding process.

The final component is a "color masterbatch," which can include stabilizers and other components that impart particular properties. One component can be a colorant, such as, for example, a gray colorant. The color masterbatch components can be blended and pelletized with a high density polymer base. The color masterbatch preferably includes at least one stabilizer. Examples of stabilizers include UV stabilizers, anti-oxidants, and other compounds to impart specific electrical properties such as track resistance. Off-the-shelf stabilizer packages can be purchased from color suppliers for HDPE and LDPE materials. Blended polymer materials made from the formulations described herein are considered natural resin and thus would typically require stabilization for its intended use. Ciba, a supplier of stabilizers, offers anti-oxidants in the Irganox® family of products and Tinuvin® in the hindered amine light stabilizer category. A compounder can be utilized to mix the ingredients of the color master batch formulation with the high density polymer base. The resultant color masterbatch is a pellet that is designed to be let down at a ratio of 19:1 or to be about 5% (by weight) of the final polymer material blend formulation.

Table 1 details one embodiment of a preferred polymer material blend formulation, which has been found to have good operability, although other percentages may be used by those skilled in the art.

TABLE 1

| Material Percentages | (at/about % by weight) |
|---|---|
| Ethylene Vinylsilane copolymer | 53 |
| Catalyst masterbatch | 5 |
| High-density Polyethylene | 37 |
| Color masterbatch | 5 |
| Total | 100 |

Polymer blend formulations can be processed to form polymer blend materials that can be used to manufacture electrical transmission products using molding or over-molding processes. In such processes, each of the material components can be provided in pellet form at the appropriate percentages by weight and can be combined using a gravimetric blender. The resultant dry blend of combined pellets can be transferred to an injection-molding machine where it can be melted and combined into a uniform melt using a dispersive mixing screw. The process conditions can be optimized for material processing. The uniform melt can then be injection molded to form a molded or over-molded electrical transmission product. Upon completion of the molding or over-molding process, the molded electrical transmission product can be subjected to steam or immersed in hot water to promote moisture curing.

Electrical transmission products that can be formed using the molding and over-molding processes described herein include, for example, as vise-top insulators; pin insulators; line post insulators; F-neck, C-neck, and J-neck pin insulators of classes ANSI 55-3.55-4, and 55-5; spacer cable spacers; brackets; hangers; line post sensors; cable restraint insulators; and vertically mounted or horizontally mounted transmission products. Examples of electrical transmission products that can be formed as molded products include, but are not limited to, vise-top insulators; pin insulators; F-neck, C-neck, and J-neck pin insulators of classes ANSI 55-3, 55-4, and 55-5; Spacer cable spacers; brackets; hangers; and cable restraint insulators. Examples of electrical transmission products that can be formed as over-molded products include, but are not limited to, line post insulators, brackets, line post sensors, and vertically mounted or horizontally mounted transmission products.

In at least one process that can be used to form over-molded electrical transmission products, a uniform melt can be formed as described above, and can then be over-molded onto a structural member, or onto a portion of a structural member. Specifically, a structural member can be provided, and at least a portion of the structural member can be placed in the mold of the injection-molding machine. The structural member can preferably be formed from an insulating material, such as, for example, fiberglass. Further; the structural member can have any suitable shape, including, but not limited to, a rod. In some examples, the structural member can also include a base, such as, for example, a metal base. The base and the structural member can be secured together, preferably using an adhesive such as, for example, a curable adhesive. The uniform melt can then be injection molded onto the structural member, or onto a portion of the structural member, to form an over-molded electrical transmission product. Upon completion of the over-molding process, the electrical transmission product can be subjected to steam or immersed in hot water to promote moisture curing.

Figure 1:
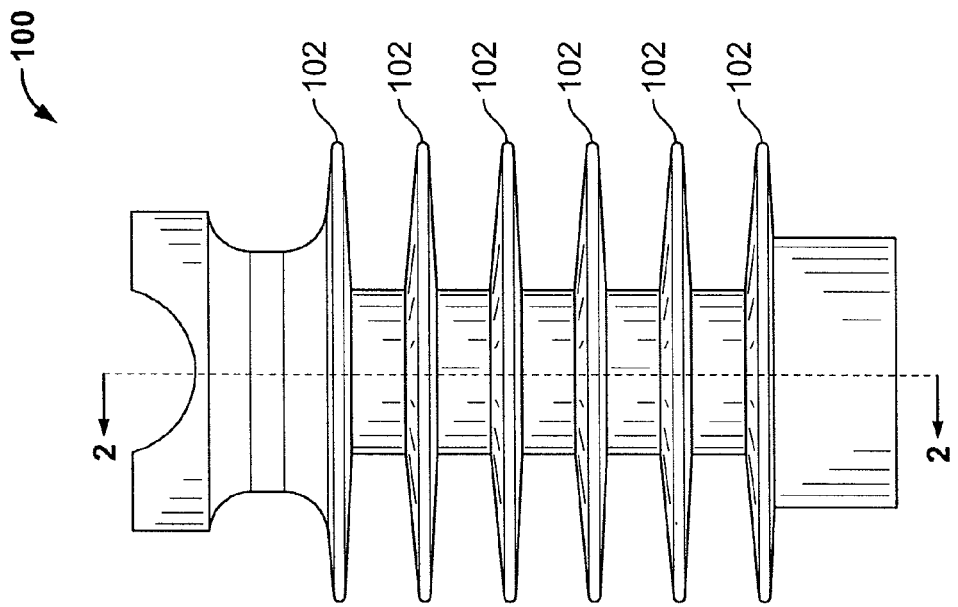
FIG. 1 illustrates an over-molded electrical transmission product.

FIGS. 1 and 2 illustrate an over-molded electrical transmission product formed by the over-molding process described above The over-molded electrical transmission product is a line post insulator indicated generally at 100. Figure two is a cross-sectional view of the over-molded line post insulator 100, as viewed along line 2 in FIG. 1. Line post insulator 100 includes a plurality of fins 102. Line post insulator 102 as illustrated is a 15 kv line post insulator. Other types of line post insulators, such as a 25 kv or 35 kv line post insulator can be formed, for example, by adding additional fins 102. Line post insulator 100 includes a structural member 104 and a polymer material blend 110 that has been over-molded on to the structural member 104 to form the line post insulator 100. The structural member includes a rod 106, which can be, for example, a fiberglass rod. The structural member also includes a base 108, which can be, for example, a metal base. The base 108 and the rod 106 can be secured together, preferably using an adhesive such as, for example, a curable adhesive.

Results and Properties

Polymer material blends made with the formulations discussed above can effectively increase the material capability to a level that exceeds the requirements for the typical utility electrical systems. The material is preferably rated at a temperature capability at or above 250° C. A material created using the formulation set forth in table 1 above was tested to 427° C. producing acceptable results.

The material has been used to manufacture and test an HPI 15, "F" neck insulator, which meets the requirements found in ANSI C 29.1, Class 55-4. Some of the material properties that have been tested include Track Resistance per ASTM D 2303, Ultraviolet (UV) Resistance per ASTM G 155, and electrical and mechanical properties required for the application and the product design. Track resistance per ASTM D 2303 was tested and passes a 1500-minute test using the "Time to Track" method. Weatherometer (UV) aging was performed to ASTM G 26-90 specifications, Test Method 1 (continuous light, intermittent water spray), Apparatus Type A, Optical filter type A (borosilicate), Irradiance setting 0.45 W/m sq. @ 340 nm. Samples are expected to be aged 3000 hours and maintain a 75% of the original tensile and elongation properties.

The puncture strength was verified to be at/about 200 kV a significant increase over the ANSI design requirement of 95 kV. The insulator cantilever strength meets the 3000-pound requirement of ANSI C29.1. The material, meets the Environmental Stress Crack Resistance requirement of ASTM D 1693, condition B. The finished material Specific Gravity is at/about 0.9584 as reported from an independent laboratory. The average Melt Flow Rate for the combined base and catalyst were measured producing an average value of 0.1 g/10 min as reported from an independent laboratory. The dielectric constant is at/about 2.3 at 1 MHz.

A proof test was done to simulate an actual cable installation. A 25' loop of 556.5 kcmil; compact, bare, aluminum conductor was heated to an elevated temperature of approximately 150° C. using amperages of 982 amps. The temperature was beyond the typical operation of electrical system conductors. A 150-pound weight was placed on the heated cable directly above a cross-linked insulator for 2 hours resulting in no damage or deformation to the insulator. A second proof test was conducted using a digital soldering iron. The soldering iron simulated an overheated conductor and offered precise heat control. The insulator was able to withstand temperatures exceeding 250° C. without melting.

The polymer material blend has also been molded and tested on pin type insulators. The insulator requires the most stringent physical and electrical requirements of electrical transmission components. However, all transmission products can benefit equally from this improvement in operating temperature, particularly those in contact with cables, which can operate at elevated temperatures. The product list can include but should not be limited to splice covers, perch preventers, wildlife protection, spacers, and secondary products such as spreaders. The material will be used for the production of line insulators such as pin type. Post Type, Suspension, and Apparatus insulators are typically manufactured by others and assembled to create a final product but they could also benefit from these material improvements in operating temperature.

The materials and products described herein are not limited with respect to color. The examples that have been formed and tested and described herein were done with a gray color, materials can also be done with other colors, including but not limited to, black, depending on the intended operating and environmental factors of the end-use product.

From the foregoing, it will be appreciated that although specific embodiments of the invention have been described herein for purposes of illustration, various modifications may be made without deviating from the spirit or scope of the invention. It is therefore intended that the foregoing detailed description be regarded as illustrative rather than limiting, and that it be understood that it is the following claims, including all equivalents, that are intended to particularly point out and distinctly claim the subject matter regarded as the invention.

What is claimed is:

1. An electrical transmission component comprising:
a structural member comprising an insulating material; and
a composition comprising a solid disposed on the structural member, the solid containing a first cross-linkable polymer resin, a high density polymer resin, a cross-linking catalyst, and a colorant, wherein the solid does not melt upon heating to 250° C.

2. The electrical transmission component of claim 1, wherein the solid exhibits essentially no deformation when heated to a temperature of about 150° C. and subjected to a 150 pound weight.

3. The electrical transmission component of claim 1, wherein the structural member includes a base.

4. The electrical transmission component of claim 1, wherein the structural member includes a fiberglass rod.

5. The electrical transmission component of claim 1, wherein the composition is over-molded on to the structural member.

6. The electrical transmission component of claim 1, wherein the first cross-linkable polymer resin of the composition comprises a low density cross-linkable polymer resin.

7. The electrical transmission component of claim 1, wherein the solid does not melt upon heating to 427° C.

8. An electrical transmission component comprising:

a structural member comprising an insulating material;

a composition comprising a solid disposed on the structural member, the solid containing a first cross-linkable polymer resin, a second high density polymer resin, a cross-linking catalyst, and a colorant, wherein the solid does not melt upon heating to 250° C.; and an insulative member comprising one of a vise-top insulator, pin insulator, line post insulator, F-neck, C-neck, and J-neck pin insulator of classes ANSI 55-3, 55-4, and 55-5, cable spacer, bracket, hanger, line post sensor, cable restraint insulator, vertically mounted transmission product, and horizontally mounted transmission product.

9. An electrical transmission component comprising:

a structural member comprising a fiberglass rod; and a composition comprising a solid disposed on the structural member, the solid containing a first cross-linkable polymer resin, a second high density polymer resin, a cross-linking catalyst, and a colorant, wherein the solid does not melt upon heating to 250° C.

* * * * *